US011898759B2

(12) United States Patent
Moore et al.

(10) Patent No.: US 11,898,759 B2
(45) Date of Patent: Feb. 13, 2024

(54) TWIST RELEASE MECHANISM FOR A MULTI-PANE DOOR ASSEMBLY

(71) Applicant: Haier US Appliance Solutions, Inc., Wilmington, DE (US)

(72) Inventors: Daniel Ian Moore, Louisville, KY (US); John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 361 days.

(21) Appl. No.: 17/313,197

(22) Filed: May 6, 2021

(65) Prior Publication Data

US 2022/0357046 A1 Nov. 10, 2022

(51) Int. Cl.

*F24C 15/02* (2006.01)
*E05C 7/02* (2006.01)
*E05B 15/02* (2006.01)
*E05C 3/30* (2006.01)

(52) U.S. Cl.

CPC ........ *F24C 15/024* (2013.01); *E05B 15/0205* (2013.01); *E05C 3/30* (2013.01); *E05C 7/02* (2013.01); *F24C 15/023* (2013.01); *E05Y 2900/308* (2013.01)

(58) Field of Classification Search

CPC .... F24C 15/045; F24C 15/022; F24C 15/024; F24C 15/023; E05C 3/124; E05C 7/02; E05C 3/14; E05C 3/30; E05B 15/0205; E05Y 2900/308

See application file for complete search history.

(56) References Cited

U.S. PATENT DOCUMENTS

| | | | | |
|---|---|---|---|---|
| 3,489,135 A | 1/1970 | Astrella | | |
| 3,717,138 A * | 2/1973 | Upp | F24C 15/04 126/200 |
| 7,895,998 B2 | 3/2011 | Lee | |
| 9,138,056 B2 | 9/2015 | Youngwoo | |
| 9,677,771 B2 | 6/2017 | Armstrong | |
| 10,398,260 B2 | 9/2019 | Park | |
| 10,502,433 B2 | 12/2019 | Na | |
| 2017/0248321 A1 | 8/2017 | Khan | |
| 2018/0292094 A1* | 10/2018 | Park | E05B 63/20 |
| 2019/0063123 A1 | 2/2019 | Ham | |
| 2022/0357106 A1* | 11/2022 | Moore | F27D 19/00 |

FOREIGN PATENT DOCUMENTS

| | | |
|---|---|---|
| CN | 201700302 U | 1/2011 |
| CN | 205514184 U | 8/2016 |
| WO | WO2018224159 A1 | 12/2018 |

* cited by examiner

*Primary Examiner* — Alfred Basichas
(74) *Attorney, Agent, or Firm* — Dority & Manning, P.A.

(57) ABSTRACT

A door assembly includes an inner door panel and an outer door panel pivotable with respect to the inner door panel, the inner door panel including a latch base. The outer door panel includes a handle assembly including a handle endcap, a handle body rotatable with respect to the handle endcap, and a latch bar connected with the handle body, the latch bar being detachably coupled to the latch base. The outer door panel is rotatable with respect to the inner door panel, such that the outer door panel can be rotated away from the inner door panel.

20 Claims, 5 Drawing Sheets

TWIST RELEASE MECHANISM FOR A MULTI-PANE DOOR ASSEMBLY

FIELD OF THE INVENTION

The present subject matter relates generally to oven appliances, and more particularly to door assemblies for oven appliances.

BACKGROUND OF THE INVENTION

Generally, oven appliances include one or more doors that rotate to allow selective access to an oven cavity for cooking food items. These conventional doors often include glass panel windows which allow a user to observe the cavity therethrough during a cooking operation. Additionally or alternatively, conventional doors include multiple panels which provide an insulating feature to retain heat within the oven cavity during the cooking operation. In some instances, the conventional doors include vent holes, assembly holes, or other apertures through which grease or foreign substances may enter the space between the multiple panels. This may cause inner surfaces of the glass panels to become dirty or otherwise obstructed, reducing the viewing ability of the user. Further, some conventional doors may include electronic or other operational equipment (such as optical devices) in the space between the panels which may require maintenance.

In order to access the space between the panels, on conventional doors, a user or maintenance worker may have to fully disassemble the door (e.g., remove the door from the oven appliance and remove a first panel from a second panel) in order to access the areas that require cleaning or maintenance. However. this increases maintenance time and can lead to damage occurring to one or more of the parts of the door. Additionally or alternatively, the separate handling of large and cumbersome glass panels can lead to breakage and/or injury to the user.

Accordingly, a door assembly that obviates one or more of the above-mentioned drawbacks would be desirable. In particular, a door assembly with improved access for cleaning and maintenance of multi-panel doors would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a door assembly is provided. The door assembly may define a vertical direction, a lateral direction, and a transverse direction. The door assembly may include an inner door panel; a latch base fixed to the inner door panel; an outer door panel pivotally connected to the inner door panel; and a handle assembly attached to the outer door panel. The handle assembly may include a handle endcap attached to an outer surface of the outer door panel; a handle body connected with the handle endcap, the handle body being rotatable with respect to the handle endcap; and a latch bar fixed to the handle body such that the latch bar rotates together with the handle body, the latch bar being detachably coupled to the latch base through the handle endcap, the inner door panel, and the outer door panel.

In another exemplary aspect of the present disclosure, a home appliance is provided. The home appliance may define a vertical direction, a lateral direction, and a transverse direction. The home appliance may include a body defining a cavity; and a door assembly pivotally attached to the body for opening and closing the cavity. The door assembly may include an inner door panel; a latch base fixed to the inner door panel; an outer door panel pivotally connected to the inner door panel; and a handle assembly attached to the outer door panel. The handle assembly may include a handle endcap attached to an outer surface of the outer door panel; a handle body connected with the handle endcap, the handle body being rotatable with respect to the handle endcap; and a latch bar fixed to the handle body such that the latch bar rotates together with the handle body, the latch bar being detachably coupled to the latch base through the handle endcap, the inner door panel, and the outer door panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
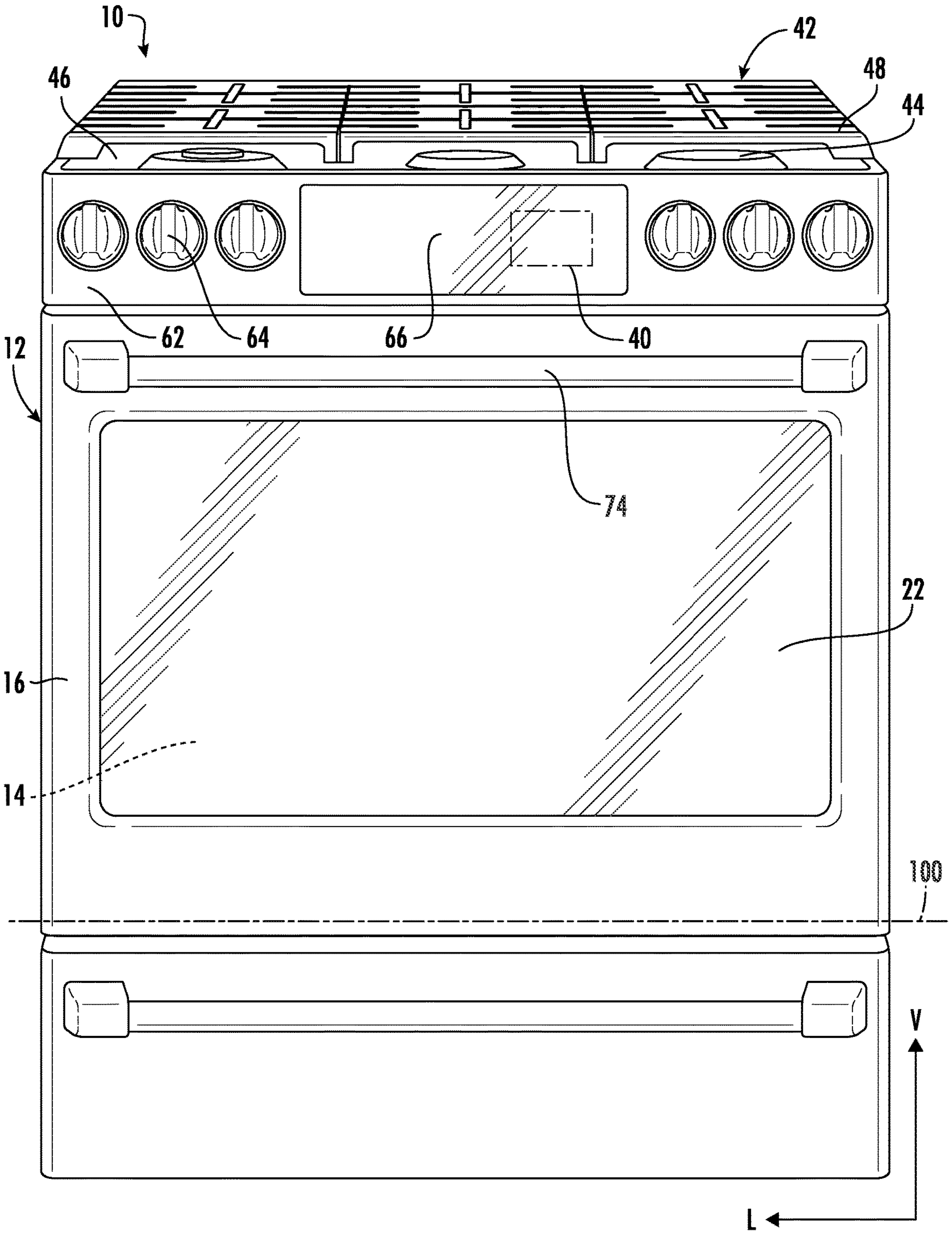
FIG. 1 provides a front view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term “or” is generally intended to be inclusive (i.e., “A or B” is intended to mean “A or B or both"). The terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

Terms such as "inner" and "outer" refer to relative directions with respect to the interior and exterior of the appliance, and in particular the chamber(s) defined therein. For example, "inner" or "inward" refers to the direction towards the interior of the appliance. Terms such as "left," "right," "front," "back," "top," or "bottom" are used with reference to the perspective of a user accessing the appliance. For example, a user stands in front of the appliance to open the door(s) and reaches into the chamber(s) to access items therein.

Turning now to the figures, FIG. 1 provides a perspective view of a home appliance, such as oven appliance 10, according to exemplary embodiments of the present disclosure. Generally, oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable appliance. Thus, the present disclosure may be used with other oven, range, or cooktop appliance configurations (e.g., configurations that define multiple interior cavities for the receipt of food, include no interior cavities, or are otherwise different than the configuration shown in FIG. 1), as well as other suitable appliances, as would be understood in light of the present disclosure.

Oven appliance 10 includes an insulated cabinet 12 with an interior cooking chamber 14 defined by an interior surface of cabinet 12. Cooking chamber 14 is configured for the receipt of one or more food items to be cooked. Oven appliance 10 includes a door 16 rotatably mounted to cabinet 12 (e.g., with a hinge—not shown). A handle 74 (described in more detail below) may be mounted to door 16 and may assist a user with opening and closing door 16 in order to access an opening to cooking chamber 14. For example, a user can pull on handle 74 to open or close door 16 and access cooking chamber 14 through the opening. As would be understood, one or more internal heating elements (e.g., baking or broiling heating elements) may be provided within cooking chamber 14 to cook or otherwise heat items therein.

Oven appliance 10 may include a seal (not shown) between door 16 and cabinet 12 that assists with maintaining heat and cooking fumes within cooking chamber 14 when door 16 is closed, as shown in FIG. 1. One or more parallel glass panes 22 provide for viewing the contents of cooking chamber 14 when door 16 is closed and assist with insulating cooking chamber 14. As will be described in more detail below, door 16 may be a dual door assembly, including an inner door panel 24 and an outer door panel 26. For instance, outer door panel 26 may be pivoted related to inner door panel 24. In detail, outer door panel 26 may rotate away from inner door panel 24, allowing access to a space between parallel glass panes 22. Optionally, a baking rack (not pictured) is positioned in cooking chamber 14 for the receipt of food items or utensils containing food items.

Oven appliance 10 may include a cooktop surface 42 having one or more heating elements 44 for use in heating or cooking operations. In exemplary embodiments, cooktop surface 42 is comprised of a metal (e.g., steel) panel 46 on which one or more grates 48 may be supported. In other embodiments, however, cooktop surface 42 may be comprised of another suitable material, such as a ceramic glass or another suitable non-metallic material. Heating elements 44 may be various sizes, as shown in FIG. 1, and may employ any suitable method for heating or cooking an object, such as a cooking utensil (not shown), and its contents. In one embodiment, for example, heating element uses a heat transfer method, such as electric coils or gas burners, to heat the cooking utensil. In another embodiment, however, heating element 44 uses an induction heating method to heat the cooking utensil directly. In turn, heating element may include a burner element, electric heat element, induction element, or another suitable heating element.

Some embodiments of oven appliance 10 include a controller 40 (e.g., configured to control one or more operations of oven appliance 10). For example, controller 40 may control at least one operation of oven appliance 10 that includes an internal heating element or cooktop heating element 44. Controller 40 may be in communication (via for example a suitable wired or wireless connection) with one or more of heating element(s) 44 and other suitable components of oven appliance 10, as discussed herein. In general, controller 40 may be operable to configure oven appliance 10 (and various components thereof) for cooking. Such configuration may be based, for instance, on a plurality of cooking factors of a selected operating cycle or mode.

By way of example, controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 40 may be positioned in a variety of locations throughout oven appliance 10. As illustrated, controller 40 may be located within a user interface 62 of oven appliance 10. In some such embodiments, input/output ("I/O") signals may be routed between controller 40 and various operational components of oven appliance 10, such as heating element(s) 44, control knobs 64, display component 66, sensors, alarms, or other components as may be provided. For instance, signals may be directed along one or more wiring harnesses that may be routed through cabinet 12. In some embodiments, controller 40 is in communication with user interface assembly 62 and control knobs 64 through which a user may select various operational features and modes and monitor progress of oven appliance 10. In one embodiment, user interface assembly 62 may represent a general purpose I/O ("GPIO") device or functional block. In one embodiment, user interface assembly 62 may include input components, such as one or more of a variety of electrical, mechanical, or electro-mechanical input devices including rotary dials, push buttons, and touch pads. User interface assembly 62 may include a display component 66, such as a digital or analog display configured to provide operational feedback to a user.

Figure 2:
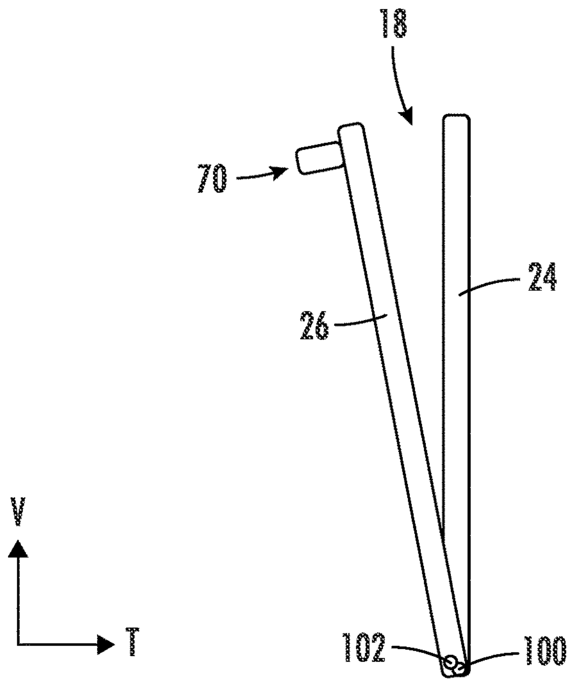
FIG. 2 provides a side schematic view of a door assembly of the exemplary oven appliance of FIG. 1.

Turning now to FIGS. 2 through 7, an exemplary embodiment of a handle assembly for a dual panel oven door will be described in detail. As discussed above, door 16 may be referred to as a door assembly 18 and may include inner door panel 24 and outer door panel 26. In some embodiments, door assembly 18 includes three or more door panels. Door assembly 18 may rotate outward from cabinet 12 about a door rotational axis 100 (see FIG. 1) defined along the lateral direction L. In some embodiments, (e.g., when door assembly 18 incorporates inner door panel 24 and outer door panel 26), outer door panel 26 may selectively rotate away from inner door panel 24 as a result of a manipulation of a handle assembly 70 (described in more detail below). For instance, an axis of rotation 102 of outer door panel 26 with respect to inner door panel 24 may be parallel to the axis of rotation 100 of door assembly 18. In some embodiments, the axis of rotation 102 may be coaxial with the axis of rotation 100. In other embodiments, the axis of rotation 102 may be offset from the axis of rotation 100 (FIG. 2, for example). It should be understood that a location of the axis 102 may be provided at any suitable location with respect to the axis 100. Additionally or alternatively, axis 102 may not be parallel with axis 100. For instance, axis 102 may be perpendicular to axis 100.

Figure 3:
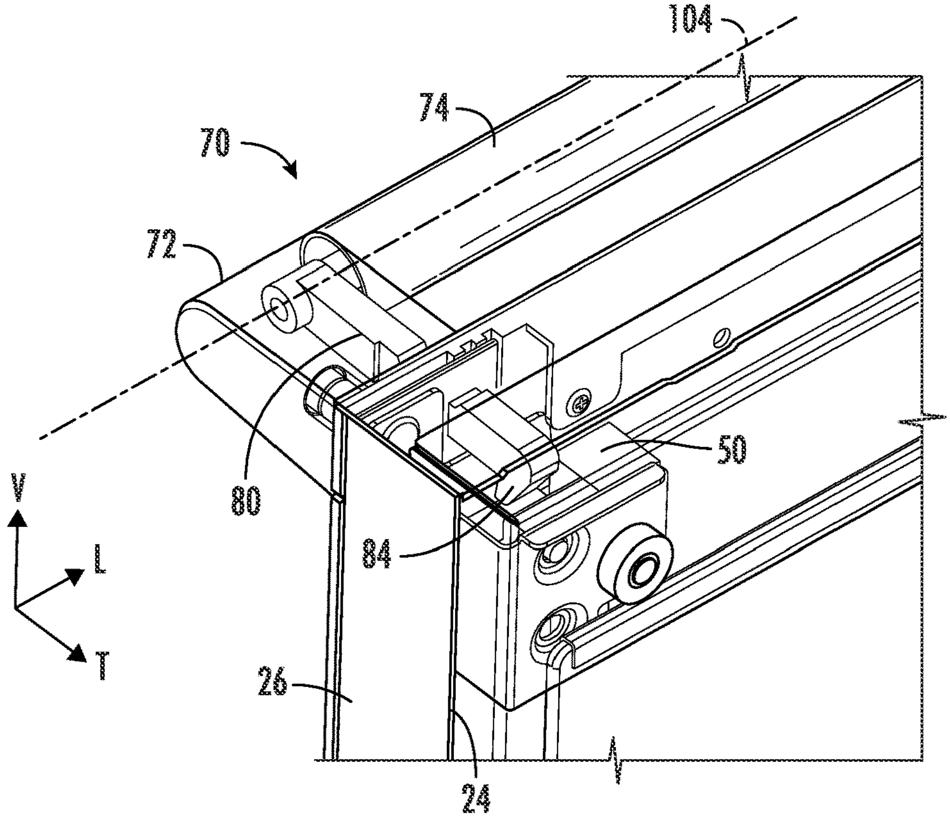
FIG. 3 provides a rear perspective view of the exemplary door assembly of FIG. 2.

FIG. 3 provides a rear perspective view of an exemplary handle assembly according to exemplary embodiments. Inner door panel 24 may include a latch base 50 (see FIG. 5 for front view). Latch base 50 may be attached to a front face of inner door panel 24 (e.g., opposite cooking chamber 14). In detail, latch base 50 may be provided between inner door panel 24 and outer door panel 26. For instance, latch base 50 may be located at or near a top of inner door panel 24 and at or near a lateral side of inner door panel 24. In some embodiments, two latch bases 50 are provided, one at either lateral side of inner door panel 24. Latch base 50 may provide a latching point that allows outer door panel 26 to connect with inner door panel 24. Latch base 50 may be attached to inner door panel 50 via one or more fasteners (not shown). However, the attachment mechanism of latch base 50 to inner door panel 24 is not limited, and any suitable mechanism may be used, such as rivets, bolts, adhesives, twist locks, or the like. Additionally or alternatively, latch base 50 may be integrally formed with inner door panel 24. In detail, latch base 50 and inner door panel 24 may be a single unitary piece.

Figure 5:
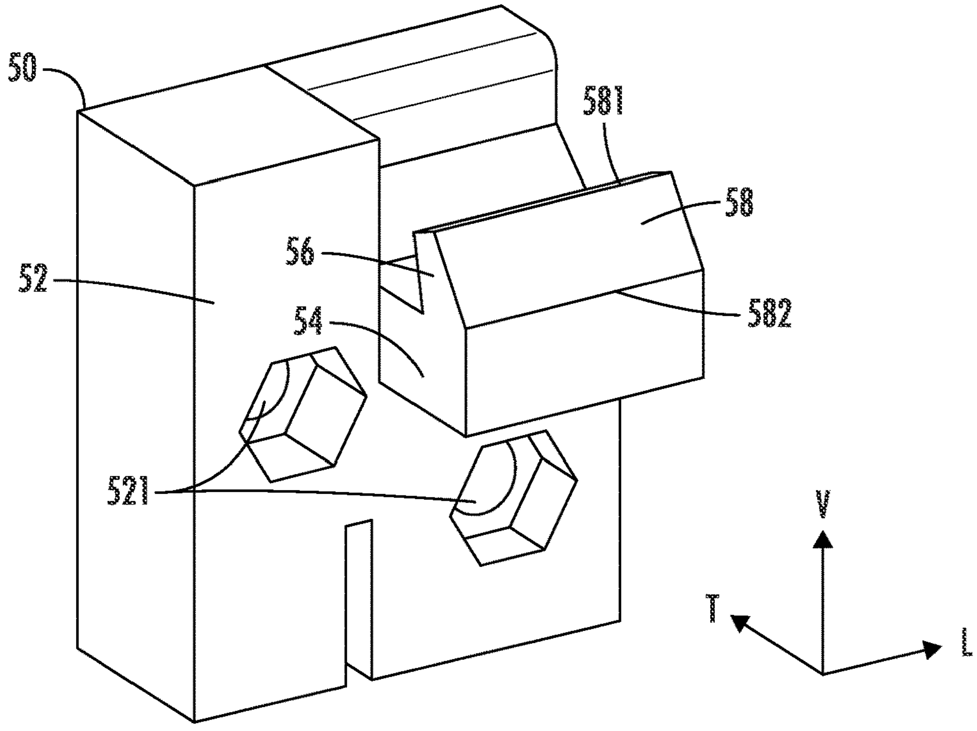
FIG. 5 provides a perspective view of a latch base of the exemplary door assembly of FIG. 2.
Figure 6:
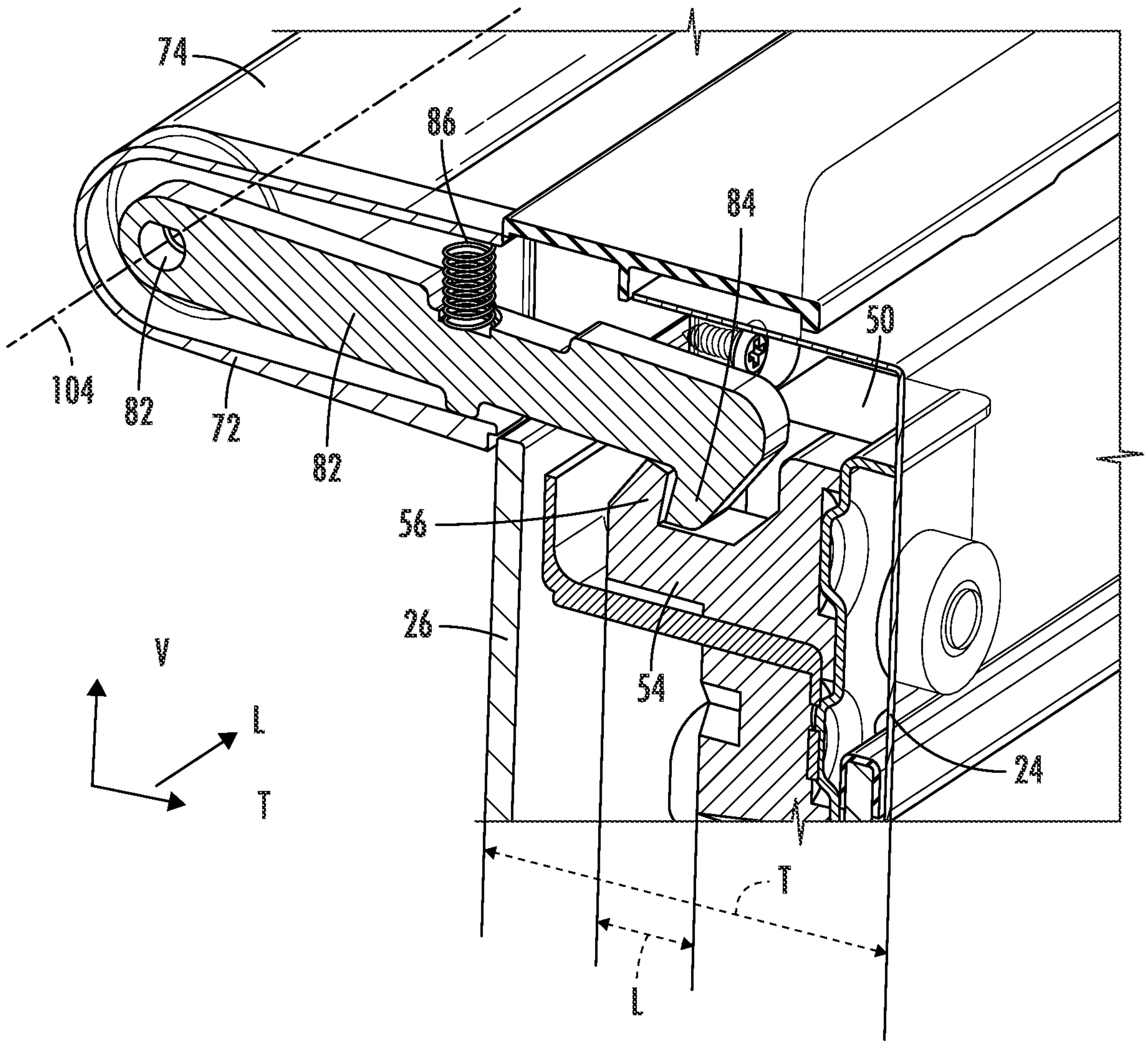
FIG. 6 provides a perspective cross-section view of the exemplary door assembly of FIG. 2 with a latch bar in a latched position.

Referring briefly to FIG. 5, latch base 50 may include a latch base body 52. Latch base body 52 may include one or more fastener holes 521 through which the fasteners may pass to attach latch base 50 to inner door panel 24. Latch base 50 may include a catch 54 protruding from latch base body 52 in the transverse direction T. For instance, catch 54 may resemble a tab or shelf that protrudes from a front face of latch base body 52 toward outer door panel 26. With reference to FIG. 6, A length L of catch 54 in the transverse direction T may be a predetermined percentage of a thickness T of door assembly 18 in the transverse direction T. For instance, length L of catch 54 in the transverse direction T may be between about 15% and about 40% of thickness T of door assembly 18.

Latch base 50 may further include a lip 56 extending in the vertical direction V from a distal end of catch 54. Catch 54 and lip 56 may collectively form a latch to which a latch bar 80 (described in more detail below) may be selectively coupled. For instance, lip 56 may extend substantially perpendicular to catch 54. A width of lip 56 may be equal to a width of catch 54 in the lateral direction. Lip 56 may extend upward from catch 54. However, in some embodiments, lip 56 extends downward from catch 54. In still other embodiments, lip 56 may extend laterally from catch 54 (e.g., toward a center of door assembly 18).

Lip 56 may define a front face 58 thereof. Front face 58 of lip 56 may be provided at an angle with respect to the vertical direction V. For instance, a bottom end 582 of front face 58 may be located further away from latch base body 52 than a top end 581 of front face 58. In detail, bottom end 582 may extend further from latch base body 52 than top end 581. Accordingly, front face 58 may provide a ramp upon which latch bar 80 slides during a closing operation of door assembly 18 (described in more detail below).

Figure 4:
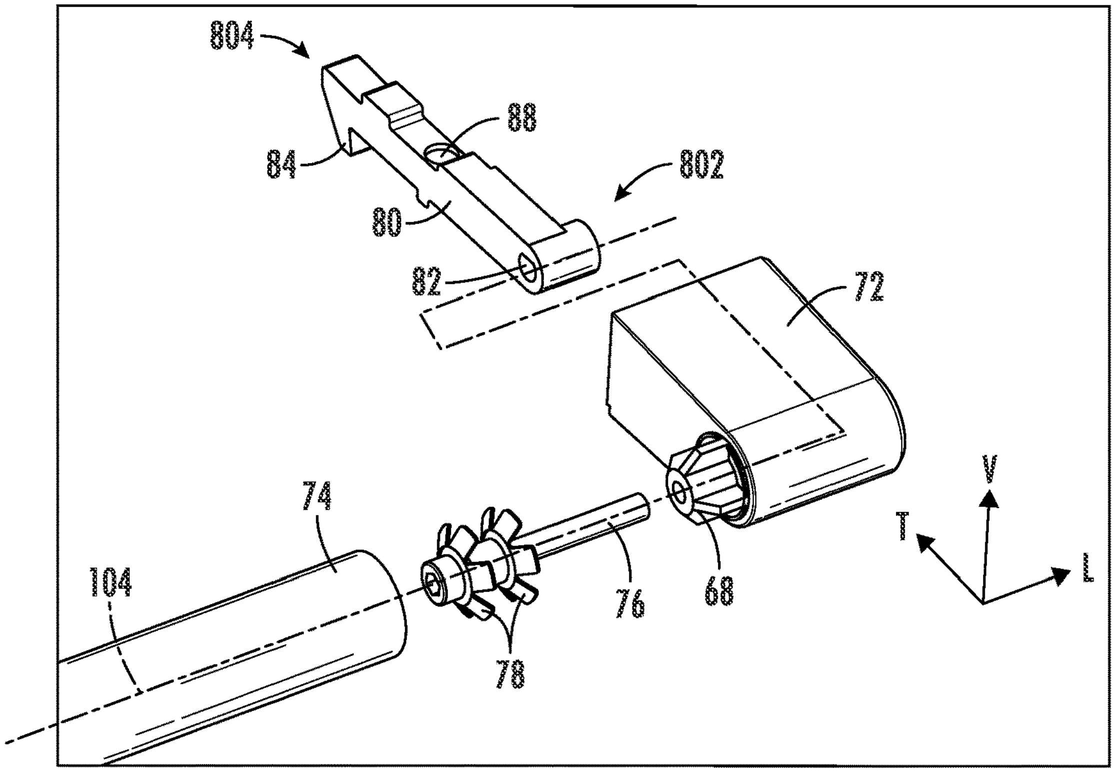
FIG. 4 provides an exploded view of a handle latch assembly of the exemplary door assembly of FIG. 2.

Outer door panel 26 may include a handle assembly 70. Handle assembly 70 may be attached to an outer face of outer door panel 26. In detail, handle assembly 70 may extend away from outer door panel 26 in the transverse direction T. Referring briefly to FIG. 4, handle assembly 70 may include a handle endcap 72. Handle endcap 72 may be fixed to the outer face of outer door panel 26. In some embodiments, handle endcap 72 is located at or near a top of outer door panel 26. Additionally or alternatively, handle endcap 72 may be provided at or near a lateral side of outer door panel 26. For instance, a location of handle endcap 72 may correspond to a location of latch base 50 with respect to the transverse direction T. In detail, handle endcap 72 may overlap latch base 50 along the transverse direction T. In some embodiments, a first handle endcap 72 may be provided at a first lateral side of outer door panel 26 and a second handle endcap 72 may be provided at a second lateral side of outer door panel 26, opposite the first lateral side. Thus, the handle endcaps 72 may correspond to the latch bases 50.

Handle endcap 72 may define a hollow therein, in which various pieces may be provided. For instance, as described in more detail below, latch bar 80 may be substantially provided within the hollow of handle endcap 72. Additionally or alternatively, handle endcap 72 may include a boss 68. Boss 68 may protrude along the lateral direction L from an inner surface of handle endcap 72. In detail, when two handle endcaps 72 are provided at opposing lateral ends of outer door panel 26, each handle endcap 72 has a boss 68, the two bosses 68 protruding toward each other along the lateral direction L. Boss 68 may be formed so as to provide rotational stability to handle body 74 (described in more detail below). Additionally or alternatively, boss 68 may assist in locating and securing handle body 74 between handle endcaps 72.

Handle assembly 70 includes handle body 74. Handle body 74 may be a bar extending along the lateral direction L (e.g., between first and second endcaps 72). Handle body 74 may have a cylindrical cross-section, having a central axis parallel to the lateral direction L. In some embodiments, handle body 74 may have other shaped cross-sections, such as square, elliptical, C-shaped, or changing along a length thereof (e.g., increasing or decreasing along the lateral direction L). As discussed above, handle body 74 may fit over boss 68 of handle endcap 72. However, handle body 74 may be rotatable with respect to boss 68 and handle endcap 72. For instance, handle body 74 may be rotatable about a handle axis of rotation 104. In detail, while handle endcap 72 remains fixed to outer door panel 26, handle body 74 may be rotatable (e.g., about boss 68).

Handle assembly 70 may further include a shaft 76. Shaft 76 may be press fit into handle body 74. For instance, one or more press fit fasteners 78 (such as star nuts, for example) may be attached to one end of shaft 76 and pressed axially into handle body 74. An opposite end of shaft 76 may have a keyed portion or profile. In detail, shaft 76 may have a keyed profile along the lateral direction. For example, a first portion of shaft 76 may be circular while a second portion of shaft 76 is flat. The shape of shaft 76 is not limited however, and shaft 76 may have a cross-section having a star shape, a square shape, a T-shape, or the like. Shaft 76 may be coaxial with handle body 74. Accordingly, when handle body 74 is rotated about handle axis 104, shaft 76 is also rotated about handle axis 104. Further, shaft 76 may be inserted into handle endcap 72 (e.g., at a distal end thereof along the transverse direction T). As will be described in more detail below, shaft 76 may also be inserted into latch bar 80.

Handle assembly 70 may include a latch bar 80. Latch bar 80 may be fixed to handle body 74 (e.g., via shaft 76) such that latch bar 80 pivots when handle body 74 is rotated. For instance, latch bar 80 may define a first end 802 and a second end 804 opposite first end 802. First end 802 may be proximate handle body 74. In detail, first end 802 of latch bar 80 may be connected with handle body 74 (e.g., via shaft 76) within handle end cap 72. First end 802 may have an aperture 82 defined there through. Aperture 82 may be a through hole formed along the lateral direction L through first end 802 of latch bar 80. Aperture 82 may be a keyed hole. In detail, aperture 82 may have a keyed portion or profile along the lateral direction. For example, a first portion of aperture 82 may be circular while a second portion of aperture 82 is flat. The shape of aperture 82 is not limited however, and may have a cross-section having a star shape, a square shape, a T-shape, or the like. For example, the cross-section of aperture 82 may be complimentary to the cross-section of shaft 76. Further, in some embodiments, latch bar 80 is integrally formed with handle body 74. In detail, latch bar 80 and handle body 74 may be a single unitary piece.

Latch bar 80 may further include a hook 84 extending from second end 804 along the vertical direction V. Hook 84 may protrude downward along the vertical direction V, e.g., from an underside of latch bar 80. A shape of hook 84 is not limited to that shown in, for example, FIG. 4, and any shape of protrusion may be defined as a hook. Hook 84 may be shaped so as to latch onto lip 56 of latch base 50. In detail, when outer door panel 26 is in a closed position (e.g., with respect to inner door panel 24), hook 84 of latch bar 80 may be restrained (e.g., in the transverse direction T) by lip 56 of latch base 50. Accordingly, outer door panel 26 may be latched together with inner door panel 24. As discussed above, front face 58 of lip 56 may be slanted to allow latch bar 80 (e.g., second end 804 and more specifically hook 84) to ride up and over top end 581 of lip 58 during a closing motion of outer door panel 26 towards inner door panel 24.

Further, as discussed previously, because handle body 74 is rotatable with respect to handle endcap 72 (and, in turn, with respect to outer door panel 26), and latch bar 80 is fixed to handle body 74 at first end 802, when a user rotates handle body 74 about handle axis 104, second end 804 (and, in turn, hook 84) may be raised along the vertical direction V (or pivoted about handle axis 104). Accordingly, during an opening of door assembly 18 (e.g., releasing outer door panel 26 from inner door panel 24), hook 84 of latch bar 80 may be raised above top end 581 of lip 56 of latch base 50, thus releasing outer door panel 26 from inner door panel 24. It should be noted that hook 84 may extend in any complimentary direction to a direction in which lip 56 extends from latch base 50. For example, when lip 56 extends laterally inward, hook 84 may extend laterally outward. Similarly, when lip 56 extends vertically downward, hook 84 may extend vertically upward. Accordingly, an orientation of lip 56 and hook 84 may be complimentary to each other regardless of orientation in order to allow latch bar 80 to latch onto latch base 50.

Figure 7:
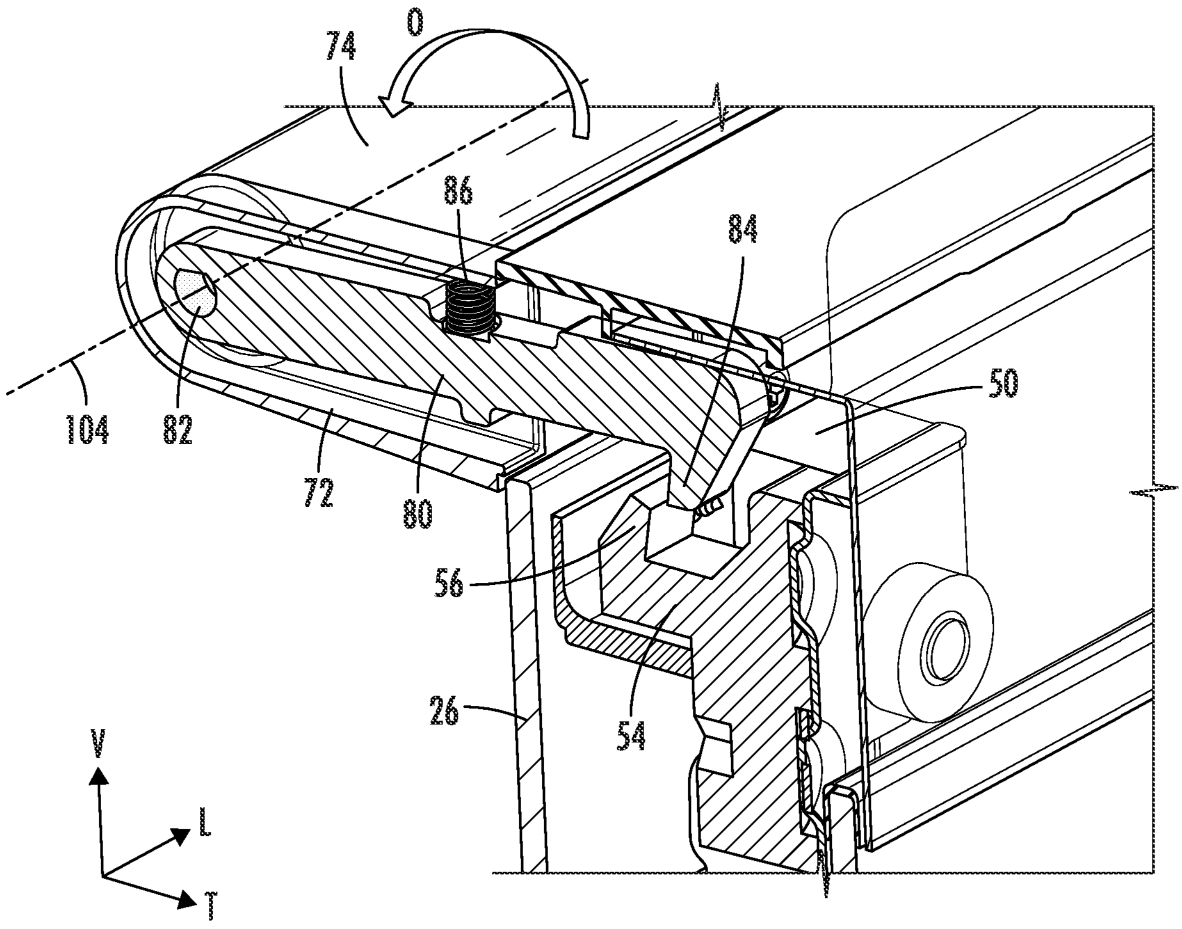
FIG. 7 provides a perspective cross-section view of the exemplary door assembly of FIG. 2 with the latch bar in an unlatched position.

Referring to FIGS. 6 and 7, handle assembly 70 may include a resilient member 86 biasing latch bar 80 into engagement with latch base 50. Resilient member 86 may be a compression spring provided within handle endcap 72 and in contact with latch bar 80 and an interior surface of handle endcap 72. For instance, latch bar 80 may include a spring seat 88 defined in a top surface of latch bar 80 (e.g., as shown in FIG. 4). Spring seat 88 may retain resilient member 86 between latch bar 80 and handle endcap 72. Accordingly, a natural position of latch bar 80 (and subsequently hook 84) may be pressed downward along the vertical direction V. Therefore, resilient member 86 may assist in retaining hook 84 in engagement with lip 56 of latch base 50, holding outer door panel 26 together with inner door panel 24. It should be noted that any suitable type of spring may be used for resilient member 86, such as a torsion spring (e.g., on shaft 76), a leaf spring, an extension spring, a rubber bumper spring, or the like. In alternate embodiments, spring 86 is omitted. In such embodiments, second end 804 may include added weight. Accordingly, second end 804 may naturally return latch bar 80 to the latched position with latch base 50.

According to this embodiment, when a user rotates handle body 74 in direction O (FIG. 7), hook 84 may become unlatched from lip 56 of latch base 50, allowing outer door panel 26 to be rotated away from inner door panel 24. However, in some embodiments, hook 84 of latch bar 80 may latch to an underside of latch base 50. Accordingly, a user may rotate handle body 74 in a direction opposite to direction O to unlatch latch bar 80 from latch base 50. Advantageously, a user may gain access to the space between outer door panel 26 and inner door panel 24 to perform maintenance, clean the glass, or adjust various instruments that may be provided therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A door assembly defining a vertical direction, a lateral direction, and a transverse direction, the door assembly comprising:
- an inner door panel;
- a latch base fixed to the inner door panel;
- an outer door panel pivotally connected to the inner door panel; and
- a handle assembly attached to the outer door panel, wherein the handle assembly comprises:
  - a handle endcap attached to an outer surface of the outer door panel;
  - a handle body connected with the handle endcap, the handle body being rotatable with respect to the handle endcap; and
  - a latch bar extending from the handle body such that the latch bar rotates together with the handle body, the latch bar being detachably coupled to the latch base through the handle endcap, the inner door panel, and the outer door panel.

2. The door assembly of claim 1, further comprising a resilient member biasing the latch bar into engagement with the latch base.

3. The door assembly of claim 2, wherein the resilient member is a compression spring biasing the latch bar in the vertical direction.

4. The door assembly of claim 1, wherein the latch bar is fixed to the handle body and comprises:
- an aperture formed laterally through a first end of the latch bar, the aperture defining a keyed portion; and
- a hook extending from a second end in the vertical direction, the second end being opposite the first end along the transverse direction.

5. The door assembly of claim 4, wherein the handle assembly further comprises a shaft extending laterally from the handle body, the shaft connecting the handle body with the latch bar through the handle endcap via the aperture.

6. The door assembly of claim 5, wherein the shaft is shaped complimentary to the keyed portion of the aperture such that the latch bar rotates together with the shaft when the handle body is rotated.

7. The door assembly of claim 6, wherein the shaft is coaxial with the handle body.

8. The door assembly of claim 4, wherein the latch base comprises a catch extending in the transverse direction, the catch comprising a lip extending in the vertical direction from a distal end of the catch.

9. The door assembly of claim 8, wherein the lip defines a front face, and wherein a bottom end of the front face is located further forward than a top end of the front face in the transverse direction.

10. The door assembly of claim 1, wherein the handle endcap is a first handle endcap, the latch bar is a first latch bar, and the latch base is a first latch base, the handle assembly further comprising:
- a second handle endcap opposite the first handle endcap along the lateral direction,
- a second latch base opposite the first latch base along the lateral direction, and
- a second latch bar opposite the first latch bar along the lateral direction, the second latch bar being detachably coupled to the second latch base through the second handle endcap.

11. A home appliance defining a vertical direction, a lateral direction, and a transverse direction, the home appliance comprising:
- a body defining a cavity; and
- a door assembly pivotally attached to the body for opening and closing the cavity, the door assembly comprising:
  - an inner door panel;
  - a latch base fixed to the inner door panel;
  - an outer door panel pivotally connected to the inner door panel; and
  - a handle assembly attached to the outer door panel, wherein the handle assembly comprises:
    - a handle endcap attached to an outer surface of the outer door panel;
    - a handle body connected with the handle endcap, the handle body being rotatable with respect to the handle endcap; and
    - a latch bar extending from the handle body such that the latch bar rotates together with the handle body, the latch bar being detachably coupled to the latch base through the handle endcap, the inner door panel, and the outer door panel.

12. The home appliance of claim 11, wherein the handle assembly further comprises a resilient member biasing the latch bar into engagement with the latch base.

13. The home appliance of claim 12, wherein the resilient member is a compression spring biasing the latch bar in the vertical direction.

14. The home appliance of claim 11, wherein the latch bar is fixed to the handle body and comprises:
- an aperture formed laterally through a first end of the latch bar, the aperture defining a keyed portion; and
- a hook extending from a second end in the vertical direction, the second end being opposite the first end along the transverse direction.

15. The home appliance of claim 14, wherein the handle assembly further comprises a shaft extending laterally from the handle body, the shaft connecting the handle body with the latch bar through the handle endcap via the aperture.

16. The home appliance of claim 15, wherein the shaft is shaped complimentary to the keyed portion of the aperture such that the latch bar rotates together with the shaft when the handle body is rotated.

17. The home appliance of claim 16, wherein the shaft is coaxial with the handle body.

18. The home appliance of claim 14, wherein the latch base comprises a catch extending in the transverse direction, the catch comprising a lip extending in the vertical direction from a distal end of the catch.

19. The home appliance of claim 18, wherein the lip defines a front face, and wherein a bottom end of the front face is located further forward than a top end of the front face in the transverse direction.

20. The home appliance of claim 11, wherein the handle endcap is a first handle endcap, the latch bar is a first latch bar, and the latch base is a first latch base, the handle assembly further comprising:
- a second handle endcap opposite the first handle endcap along the lateral direction,
- a second latch base opposite the first latch base along the lateral direction, and
- a second latch bar opposite the first latch bar along the lateral direction, the second latch bar being detachably coupled to the second latch base through the second handle endcap.

* * * * *